UNITED STATES PATENT OFFICE.

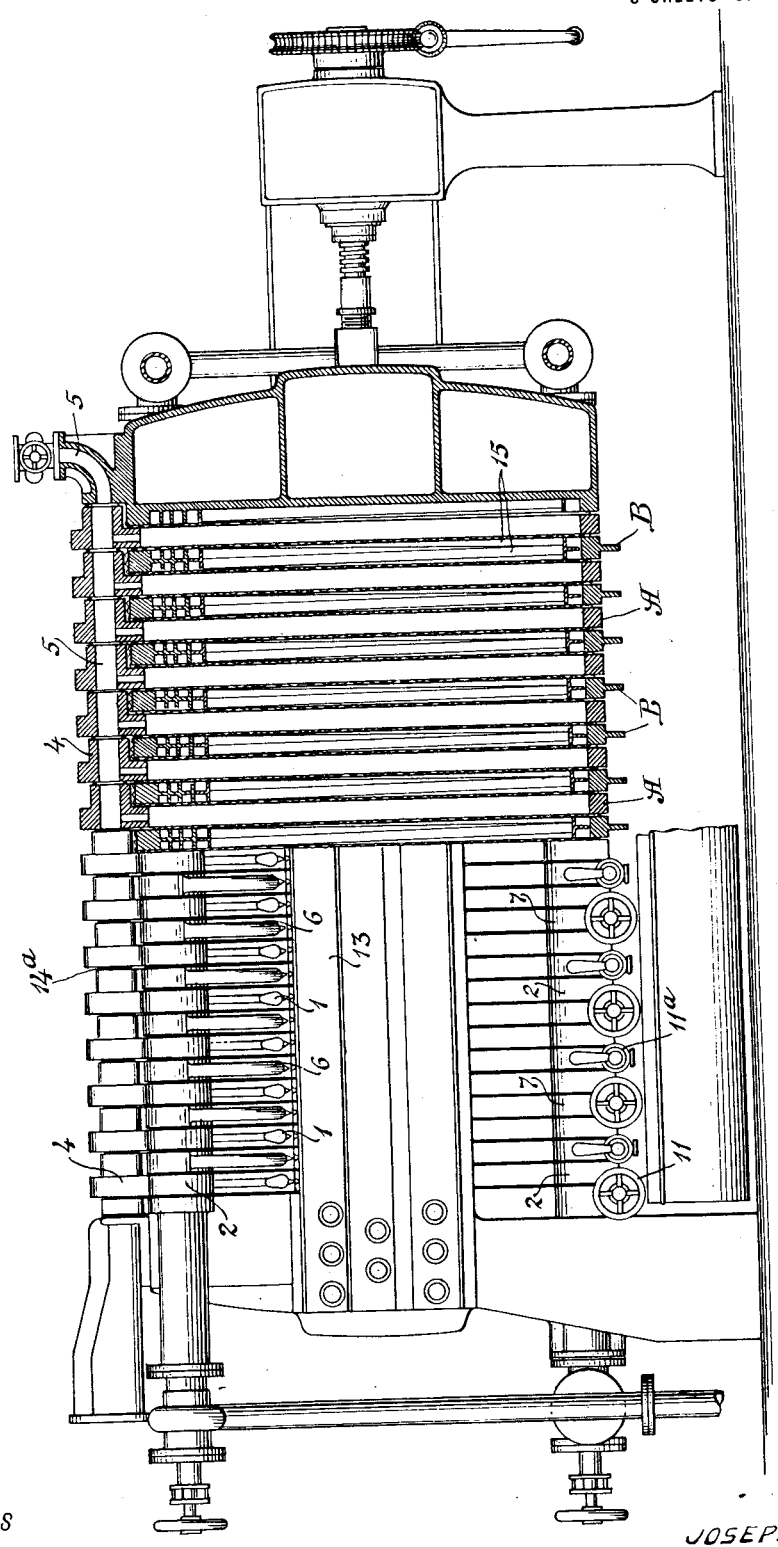

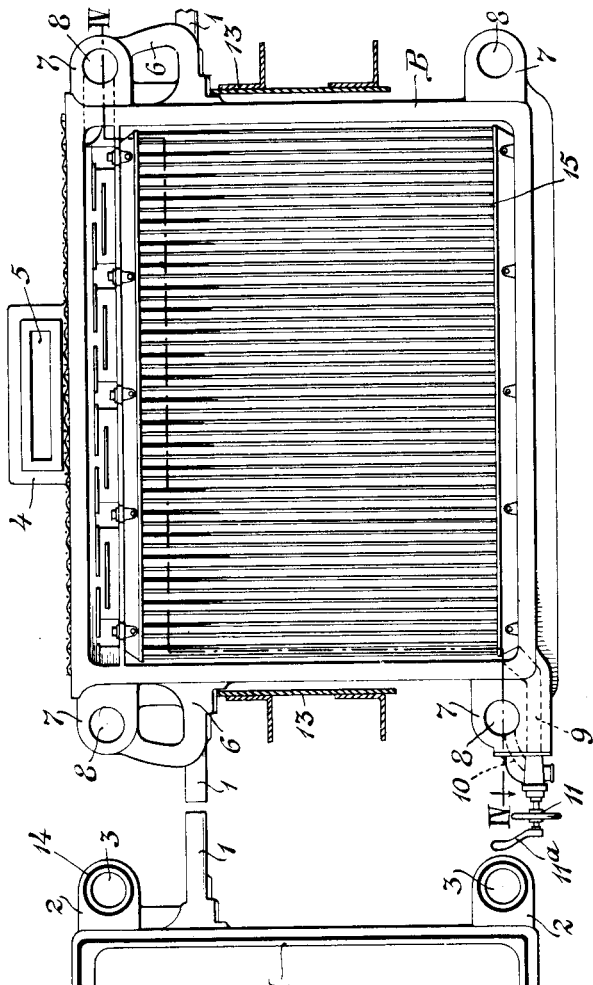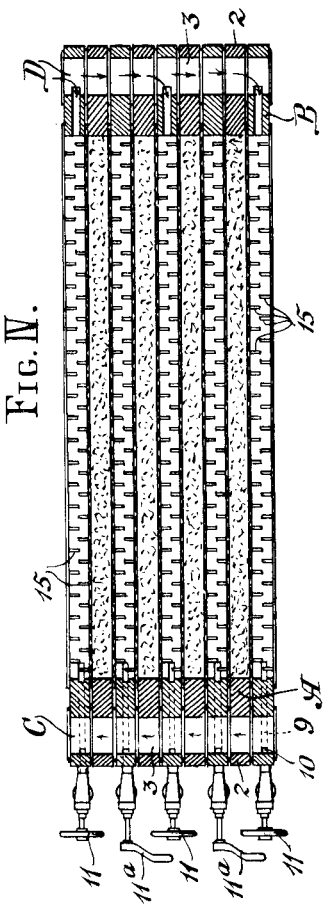

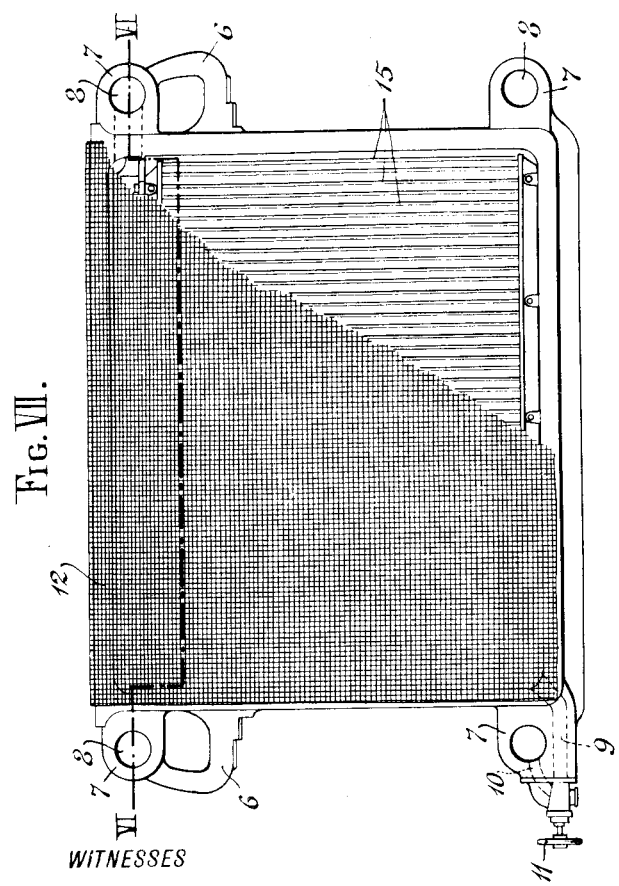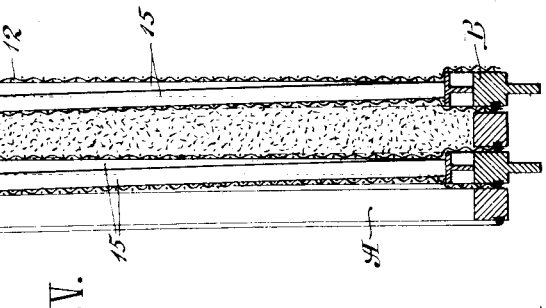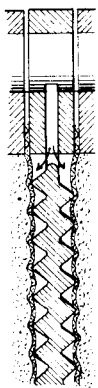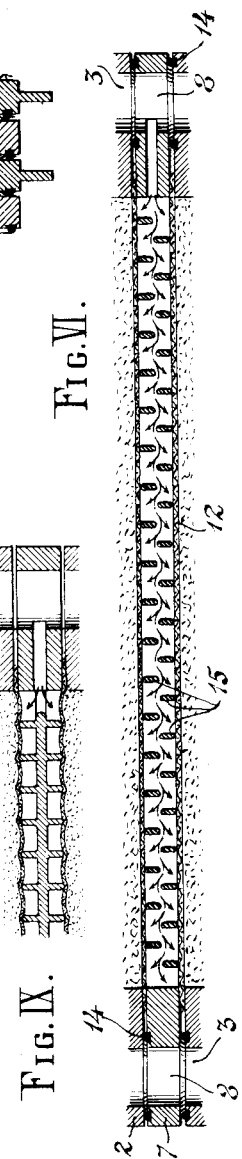

JOSEPH SCHAEFER, OF FRANKFORT-ON-THE-MAIN, GERMANY.

METHOD FOR EXTRACTING WORT FROM MASHES.

1,141,491.  Specification of Letters Patent.  Patented June 1, 1915.

Application filed March 19, 1912. Serial No. 684,715.

*To all whom it may concern:*

Be it known that I, JOSEPH SCHAEFER, a citizen of the German Empire, residing in Frankfort-on the Main, Germany, have invented a certain new and useful Improvement in Methods for Extracting Wort from Mashes, of which the following is a specification.

My invention relates to a method for extracting wort from mashes and with an apparatus for carrying out such method, is particularly adapted for use in removing the wort from the mash in the arts of brewing, distilling or manufacture of compressed yeast.

One of its objects is to remove the wort as quickly and completely as possible without the use of an excessive amount of water.

Other objects will hereinafter appear.

While my invention is applicable to a great many arts, I will describe its application to the art of brewing. It is a well-known step in this art to separate the mash into wort on the one hand and brewers' grains on the other. The mash is first filtered so that as much of the wort as is sufficiently liquid to flow, may flow through the filtering medium, leaving behind a cake of brewers' grains to the particles of which is attached a very large percentage of sticky or syrupy wort. In order to remove this remaining wort it becomes necessary to run water through the cake for the purpose of sparging or leaching out the valuable sugars.

The great problem which confronts the brewer resides in the fact that the quantity of water which may be used in the leaching process is limited, first because of the limited capacity of the wort receiving kettle; secondly the necessity of keeping the percentage of sugars in the kettle above a certain point; and thirdly, the impracticability of boiling off any excess of water which may be present in the kettle in order to increase the percentage of sugars. The expense of boiling off surplus water to obtain the desired concentration of the wort, would be so great that the brewer would ordinarily prefer to discard the unrecovered sugars with the brewers' grains. Such concentration by boiling would moreover be impractical, because it would consume valuable time and it would also concentrate the mineral substances present in the water to an undesirable point. Then, too, it is not deemed advisable to boil the wort for any length of time before adding the hops in the kettle.

Various distinct features of my invention will be pointed out in the specification and the claim.

An apparatus which is adapted for carrying out my invention, and by means of which I may practice the same is illustrated in the drawings in which—

Figure I is a side view of my apparatus shown partially in vertical section; Fig. II is a filter cake frame; Fig. III a water chamber frame; Fig. IV a view showing the filter cake frames and the water chamber frames assembled being a section along the line IV—IV of Fig. III. Fig. V is an enlarged transverse vertical section showing assembled frames; Fig. VI is a horizontal section on the lines VI—VI of Fig. VII and Fig. VII is a view of a water chamber frame showing a filter cloth, partly broken away, mounted thereon. Figs. VIII and IX represent prior forms of water frames with solid partitions.

In Fig. I there are shown assembled in alternate order filter cake frames A and water chamber frames B. The remainder of the apparatus shown in Fig. I is of the well-known construction of a filter press and need, therefore, be no further described here, especially as my invention relates in this application more particularly to the method, the arrangement of the frames being reserved for another application and the remainder of the apparatus has no particular bearing upon my invention.

Fig. II is a side view of the filter cake frame A, provided with lugs 1, 1, by means of which the frame may be supported in the apparatus in the well known manner. 2, 2, 2, 2 are lugs, each provided with an aperture 3 for a purpose which will hereinafter appear. 4 is an extension provided with an aperture 5 for a purpose which will hereinafter appear.

Fig. III shows a side view of a water chamber frame B provided with lugs 6, 6, by means of which the frame is supported in the apparatus in the well known manner, and lugs 7, 7, 7, 7, each provided with an aperture 8 for a purpose which will hereinafter appear. Any suitable or preferred arrangement of exit channels may be employed but in the present instance I employ sub-channels 9 connecting with the lower left hand corner of each water chamber as indicated by dotted lines in Figs. III, IV and VII. Another sub-channel 10 in the same lug 7 extends from the aperture 8. A three-way valve 11 connects the two sub-channels 9 and 10 with an outlet port, the arrangement being such that the outflow from each chamber may be controlled; that is, either cut off entirely or conducted into the tubular aperture 8 as and for the purpose hereinafter explained.

The filter cake frames and water chamber frames are assembled in alternate order with the filter cloths 12 therebetween, by being placed in the manner shown in Figs. I and III upon the rails 13, 13. Gaskets 14 are provided so that the apertures 3 and 8 when alined may form continuous practicable pipes or conduits for conducting liquids. Gaskets 14ᵈ are similarly provided to form a continuous conduit of the apertures 5 through which the mash is introduced into the filter cake frames.

Each water chamber frame B is provided with a number of bars 15 preferably arranged in staggered relation and also preferably arranged so that their outer edges lie in planes which diverge upwardly. These bars serve to support the filter cloths 12 and tend to give to the filter cake the trapezoidal section indicated in Fig. V. I have found that this trapezoidal formation of the cakes assists greatly in maintaining uniformity in the sparging process and in a reduction of the amount of water required.

The mash which has been prepared in the usual manner in the mash tube (not shown) is transferred through a suitable pipe (not shown) to the channel 5 and runs by gravity or under pump pressure through sub-channels into the cake chambers A where the solid material, the so-called grains will remain and form a cake, and whence the wort will run through the cloth into the water chamber B and then through cocks 11 into a suitable receptacle.

After the wort runs clear, which ought to be the case within two or three minutes after tapping, the cocks are preferably turned so as to close the outlet ports and to put the water chambers into communication with the apertures 8 through the channels 9 and 10 and the wort is run through the pipe C, formed by the apertures 8 and 3 as previously explained, in the course and direction indicated by the arrows, as shown in Fig. IV. By this means clogging of the filter cloths, which would occur in structures such as shown in Figs. VIII and IX as a result of the back pressure caused by the additional friction and the necessity of raising the column of liquid in the cells between the ribs is prevented. When the cake chambers are full of solid material and the wort has been drained from the same no further mash is fed to the apparatus, and the sparging or extracting process begins. In my sparging process alternate water chambers are made receiving chambers for the spargings while water is introduced into the other chambers. Any suitable or preferred arrangement of the channels and the valves, for this purpose, may be used but in the present instance alternate cocks 11 hitherto opened so as to communicate with apertures 8 are closed and alternate cocks 11ᵃ are allowed to maintain communication between alternate water chambers and the pipe C. Water enters through pipe D and thus through each alternate water chamber as indicated by the arrows in Fig. IV, first filling the chambers and then passing generally in a horizontal direction through the grains in adjacent cake chambers A, enters the alternate chambers B, which do not receive water direct, and thence flows through the pipe C into a suitable receptacle. During its passage through the grains cakes the water has taken up the soluble matter remaining in the grains and thus leaves the grains cakes in the condition of a somewhat diluted wort.

By the peculiar construction of my water chambers, the water may not only flow freely into all parts of the chamber, but may flow with practically no obstruction through the filter cloths into the grains cakes. Moreover the filter cloths are maintained suitably spaced apart from one another, particularly when the rods or bars, are arranged in staggered order as specifically shown in the drawings.

I have found that by my method unusually good results are obtained by reason of the fact that my water chambers are open from side to side, so as to permit the water current to have as free access as possible to each of the two filter cakes which inclose the water chamber. The source of one of the difficulties in the way of obtaining the greatest amount of extract is to be found in the fact that adjacent filter cakes are not likely to be packed to an equal degree of density. In the old apparatus, in which the water chambers were divided by a plate, the water on that side of the plate adjacent to the cake of greater density would flow more slowly than the water on the other side of the plate. This was due to the fact, not only that the flow was impeded by a more closely packed filter cake but also to the fact that the water in the chamber before passing through the cake already had taken into solution a certain percentage of sugar, thus forming a syrupy fluid, which fluid would naturally travel still more slowly through the packed filter cake. On the other side of the chamber the conditions would be reversed, that is to say the water, coming in contact with a less densely packed filter cake, would tend to take the path of least resistance and flow more freely. Thus the water on one side of the chamber would flow too slowly through the cake that needed the larger flow of water, while on the other side, it flowed too quickly through the cake which needed a lesser flow of water. As all chambers had to be operated at the same time, it is evident that the result of this condition was either that in order to leach out the tighter cake completely, too much water had to be allowed to flow through the other cake; or that in order to prevent excessive dilution of the extract, some of the sugars in the tightly packed cake had to be allowed to go to waste.

By leaving the water chamber as open as possible from side to side as done by my method, the first advantage obtained is that the water cannot stagnate in any part of the chamber and always retains in addition to its pressure a certain momentum in all parts of the chamber. In practice, I have found that this momentum is of particular value in assuring the penetration of the more tightly packed cakes by the water. A more important advantage, however, resides in the fact that the sugars taken up in solution by the water while it is still in the chamber are quickly diffused throughout the chamber.

Where the chamber is divided by a plate, the more slowly flowing water attempting to pass through the more tightly packed filter cake, would have time to take up in solution a higher percentage of sugars, while the percentage of sugars on the other side of the plate would be very much less. By the old method, therefore, the flow was retarded at the point where it was most to be desired, by the fact that the liquid was becoming highly charged with sugars while at the point where the lesser degree of flow was desired, the smaller percentage of sugars permitted a faster flow. I have found that by permitting a free and rapid diffusion throughout the chamber, I obtain the very opposite of this result; that is, I reduce the percentage of sugars at the side of the more tightly packed filter cake, thus permitting a freer flow of the water through the same, while I increase the percentage of sugars on the side of the less tightly packed filter cake, thus retarding the flow through the latter cake. Thus, where under former conditions, the solution on one side of the plate contained 5% of sugars and on the other 2%, under conditions present in an open water chamber, the average content would be 3½%. This 3½% solution would obviously flow more quickly through the more tightly packed filter cake than would a 5% solution and more slowly through the less tightly packed filter cake than would a 2% solution.

Similar advantages are obtained by the use of the open water chamber to receive the spargings or extract from the filter cake. As has already been described, alternate water chambers are used for introducing water to the filter cakes, while the remaining water chambers are used for receiving the extract as it flows from the filter cakes and conducting the same to the exit pipes. Thus, in Fig. V, one of the water chambers, for instance, the one marked $x$, is used for introducing water and the one marked $y$ for receiving and removing the extract. As has already been stated, a fruitful source of difficulty in the use of an apparatus of this kind is to be found in the unequal packing of the filter cake. Assuming now that the exit chamber $y$ were divided by two plates in accordance with the old method, we would have the result that the extract flowing on one side of the chamber would be richer in sugars than the extract flowing on the other side. The richer the extract, the slower is its flow and the converse is equally true, thus the more tightly packed filter cake would yield the richer extract, which would, however, pass off at a lesser rate of flow, while the less tightly packed filter cake would yield an extract with a lower percentage of sugars which would, however, flow away at a more rapid rate. Thus, the conditions which have already been described in connection with the entrance water chamber would be duplicated, that is to say, the flow would be more rapid where a less rapid flow is desired and vice versa.

By permitting, as I do, the freest possible diffusion through my water chamber which received the extract, I equalize the percentage of sugar throughout the chamber. Thus, where, for example, a 15% extract formerly flowed from the more tightly packed cake and a 5% extract flowed from the less tightly packed cake, I would now have a 10% extract flowing from the chamber into the exit pipes. This would result in a slower flow of liquid away from, and therefore through the less tightly packed filter cake and a more rapid flow of liquid away from, and therefore through the more tightly packed cake. Thus, the leaching throughout the apparatus is equalized to a very large degree and the percentage of sugars in the extract in the kettle very largely increased and the loss of sugars, by discard with the brewers' grains, greatly diminished. The advantage of my invention resides, therefore, not only in the saving of time, but also in the fact that less water must be evaporated from the wort during the hop boiling process.

While my invention may be carried out in an apparatus having water chambers in which the rods or bars are parallel to one another, it is by far preferable so to arrange the bars that the grains cake is thicker at the bottom than at the top, for instance, by placing the lower ends of the bars more closely together than their upper ends. Thus, the shape of the grains cake is determined by the position of the bars, the cake will be shaped somewhat as shown in Fig. V. Thus, at the point where the water pressure is greatest, the cake is thickest and the sparging process proceeds more uniformly and the lower portion of the cake is not cleared of soluble matter before the completion of the entire operation, and the water is not wasted by running clear through such lower portion.

I claim:

The method herein described of separating wort from grains which consists in forming the grains into trapezoidal cakes increasing in thickness toward the bottom, said cakes being spaced apart, the faces of each cake being ribbed uniformly from top to bottom, then treating the cakes through said ribbed portions by water, introduced into alternate spaces between said cakes without alteration of the pressure on the cakes at any part of their surfaces due to the head of this water, whereby uniform separation of the wort throughout the cake is obtained.

In testimony whereof I have signed this specification in the presence of two subscribing witnesses.

JOSEPH SCHAEFER.

Witnesses:
H. H. FREUND,
JOHN A. KEHLENBECK.